United States Patent Office 3,499,267
Patented Mar. 10, 1970

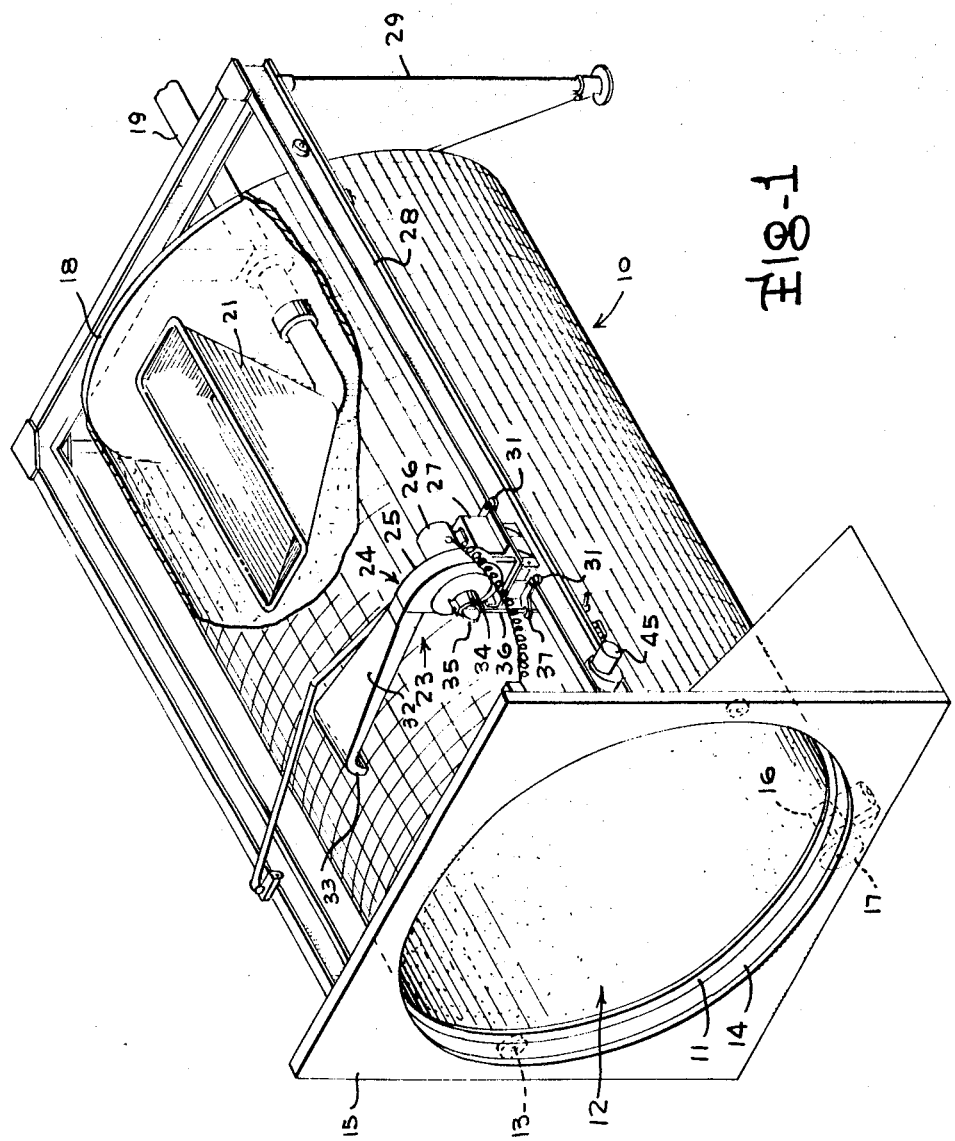

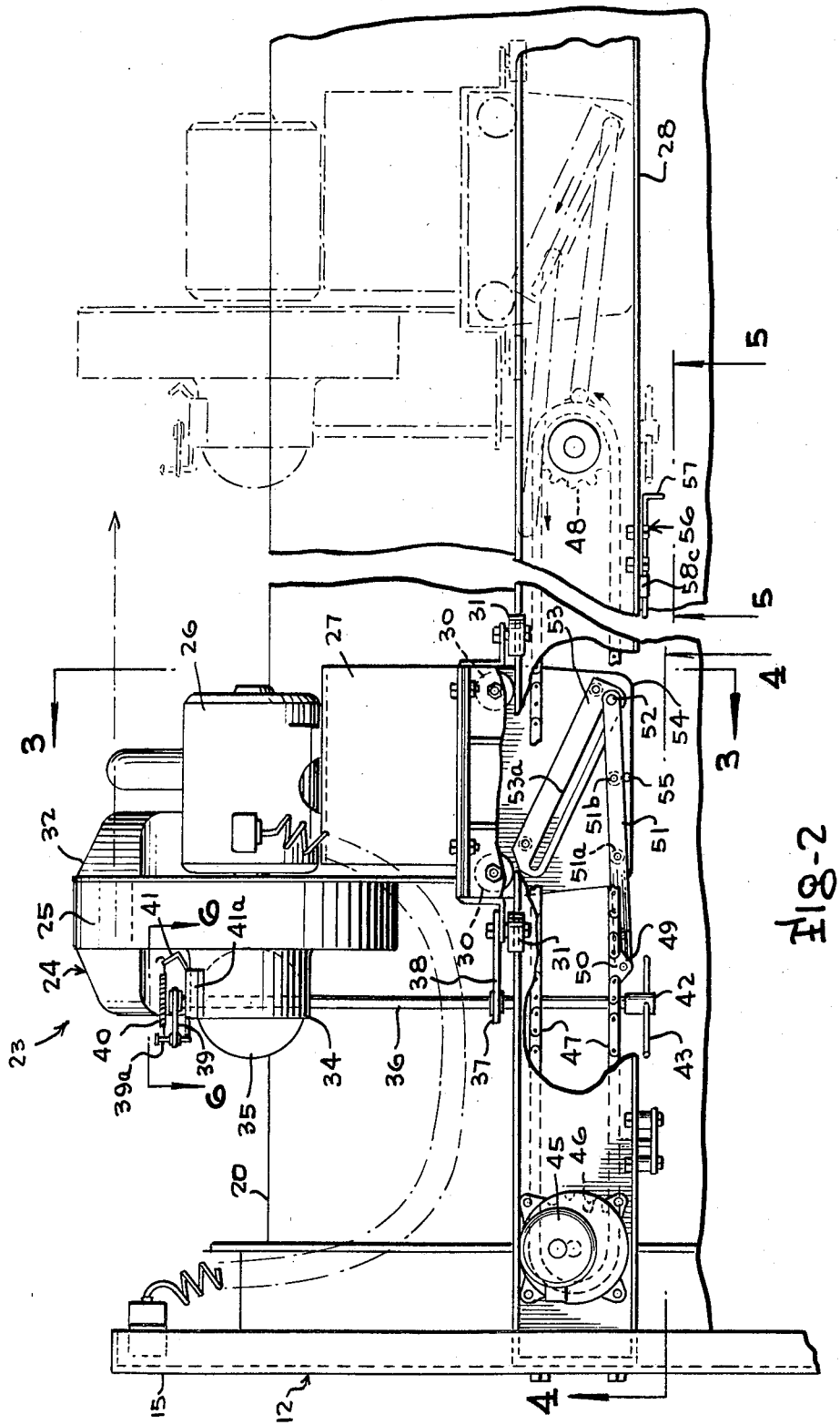

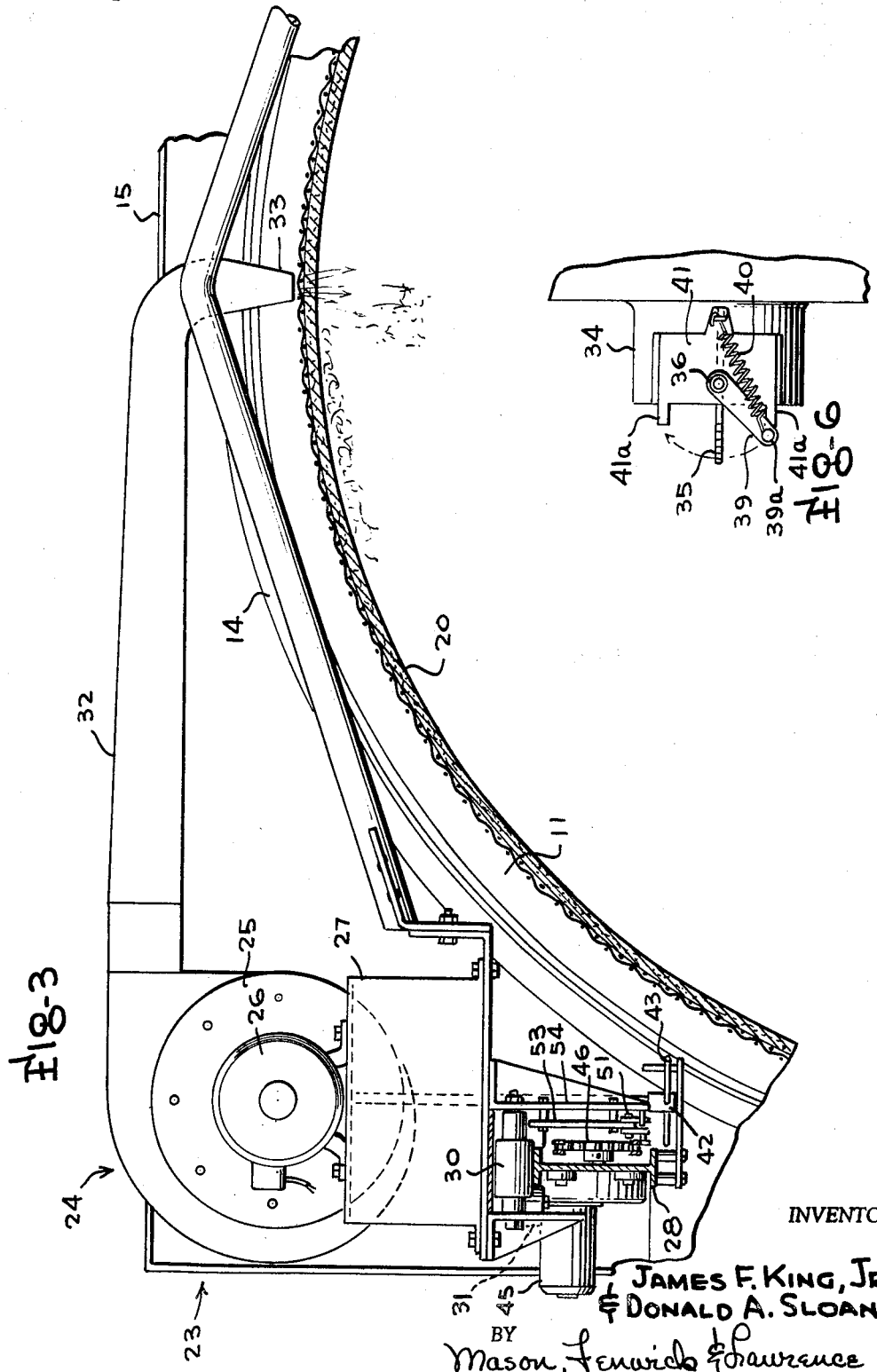

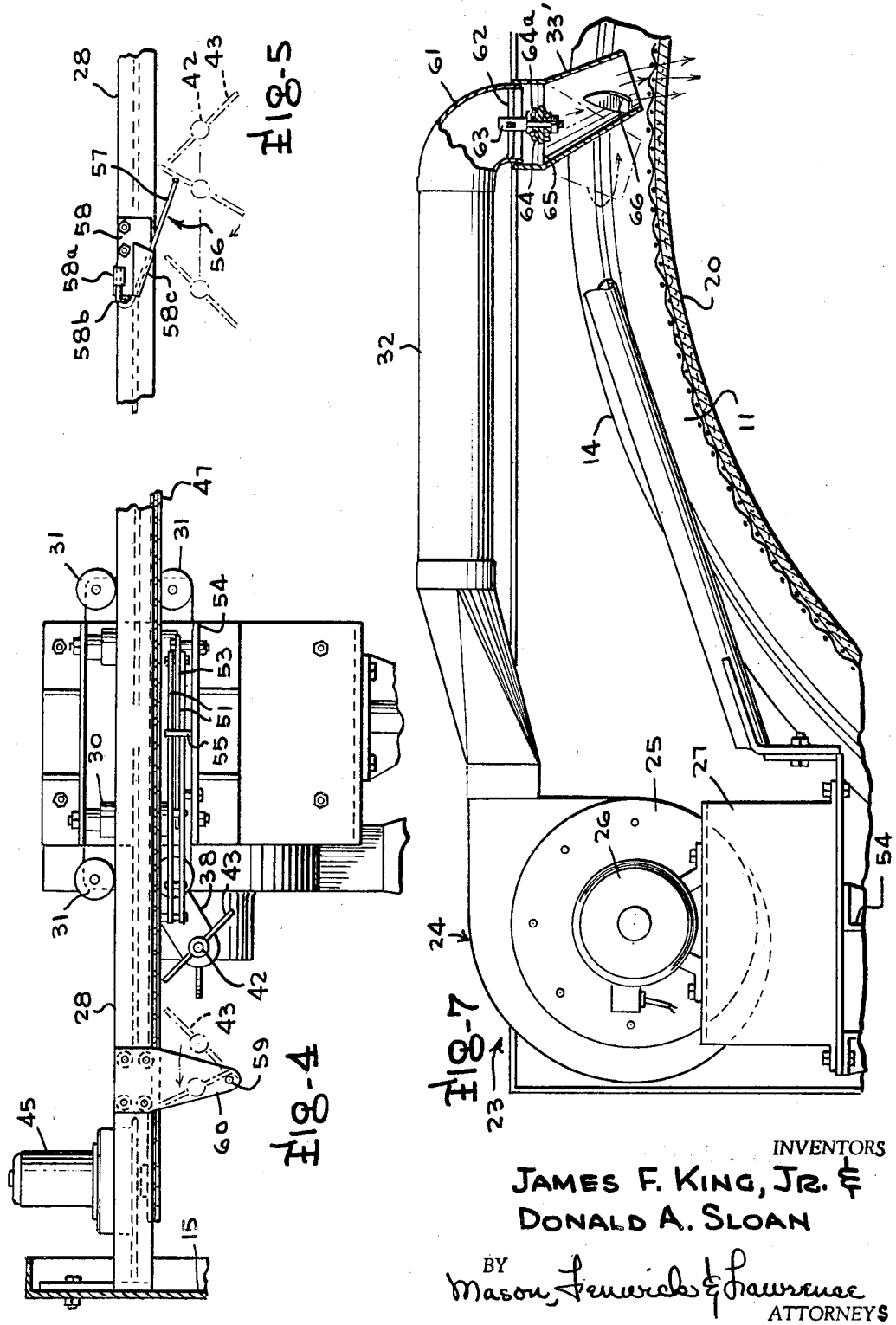

3,499,267
CLEANING APPARATUS FOR ROTARY DRUM FILTERS
James F. King, Jr., and Donald Alfred Sloan, Winston-Salem, N.C., assignors to The Bahnson Company, Winston-Salem, N.C., a corporation of North Carolina
Filed Aug. 20, 1968, Ser. No. 754,007
Int. Cl. B01d 45/18
U.S. Cl. 55—290                                    9 Claims

ABSTRACT OF THE DISCLOSURE

Apparatus for cleaning the filter medium surface of a rotary drum type filter wherein contaminant laden air enters an open end of the filter drum and is withdrawn outwardly through the filter medium wall to accumulate the contaminants on the interior surface of the drum wall, and suction collection means communicating with the interior of the drum wihtdraws the contaminants from a selected location within the drum. A blower nozzle outwardly adjacent the drum wall is reciprocated along a scanning path paralleling the drum axis during rotation of the drum to dislodge the contaminant accumulations from the drum wall and cause them to migrate to the suction location, and is caused to stop and dwell for at least one drum revolution when it reaches each end of the drum. The blower nozzle may be rotated in a special manner to keep the mat of accumulated contaminants from rotating or curling back on itself and to cause the mat to be exploded away from the filter medium surface.

BACKGROUND AND OBJECTS OF THE INVENTION

There is disclosed in my earlier application Ser. No. 608,879, filed Jan. 12, 1967, a rotary drum type of filter mechanism particularly adapted for use in textile air conditioning installations for extracting air borne lint fly, fibers, dust and other fine particles from air being withdrawn from a textile processing space for conditioning and recirculation to such space. In such apparatus, the lint laden air is delivered to the interior of the drum through an open end of the drum, and is withdrawn outwardly through a filter medium forming the cylindrical wall of the drum. A suction collection zone is established at a selected location in the interior of the drum for withdrawal of the contaminants to a suitable collecting facility. A blower nozzle scans a rectilinear path located immediately outwardly from the filter medium surface along an axis paralleling the drum axis while the drum is rotating to direct a high velocity jet of air from the outside of the filter inwardly through the filter surface for dislodging the contaminant particles and accumulated masses of lint from the filter surface and cause them to be moved to the suction collection zone for withdrawal from the system.

Efforts to increase the speed of travel of the cleaning blower through its cleaning stroke in such rotary drum filter installations introduce certain problems in achieving the desired quality of cleaning the whole filter surface. Since the filter drum revolves about its axis concurrently with rectilinear movement of the cleaning blower through its cleaning stroke, the cleaning air blast discharged from the blower effectively describes a spiral path along the surface of the filter drum. With higher speeds of travel of the cleaning blower, the pitch of the spiral path increases to such an extent that special provision must be made to achieve proper cleaning at each end of the cleaning stroke where the blower reverses and commences travel in the opposite direction. This is achieved by causing the blower to stop and dwell for at least one drum revolution at the closed end of the drum or at the end of its full cleaning stroke before causing the blower to travel through its return stroke to the other end of the drum.

Also, superior dislodgment of the mat of contaminant material (hereinafter frequently referred to as the filter mat), which accumulates on the inner surface of the cylindrical drum wall, can be achieved by providing a rotating nozzle structure at the air discharge end of the cleaning blower assembly and causing the nozzle to rotate in such manner that it attacks a limited area of the deposited filter mat spaced a selected distance inwardly along the filter mat from the area of the drum surface which has already been cleaned and then sweep the cleaning air stream outwardly toward the area already cleaned. This movement of the cleaning air discharge nozzle upon rotation of the nozzle, in conjunction with the movement of the cleaning blower through its cleaning stroke and the rotation of the drum, produces superior explosion of the mat away from the filter surface and dislodges the mat in smaller pieces which can be readily removed from the interior of the drum by the suction collection facility. Furthermore, provision of a rotating blower nozzle permits higher velocity cleaning air to be directed against the filter medium without causing an unacceptable amount of sagging of the filter medium toward the axis of the drum, because the air pressure is continuously progressed from one portion of the drum surface to another without being sustained on any one portion for any extended length of time. Furthermore, the rotation of the nozzle imparts a desirable agitation to the filter medium and the material making up the filter mat so that the filter mat may be more effectively removed.

An object of the present invention, therefore, is the provision of a novel rotary drum type of air filter having traveling cleaning blower means reciprocated through cleaning and return strokes for automatically cleaning the filter surface, wherein the blower means is caused to progress through its cleaning stroke at higher speeds and is caused to dwell at a selected location at each end of its cleaning stroke for a period of time to insure thorough cleaning of the whole filter surface.

Another object of the present invention is the provision of a novel rotary drum filter apparatus having traveling cleaning blower means for automatically periodically cleaning the filter surface, wherein a rotary discharge nozzle is provided for the cleaning blower means to cause the cleaning air stream to rotate in a selected manner producing improved explosion of the accumulated contaminants from the filter surface.

Other objects, advantages and capabilities of the present invention will become apparent from the ensuing detailed description taken in conjunction with the accompanying drawings illustrating a preferred embodiment of the invention.

SUMMARY OF THE INVENTION

The filter apparatus of the present invention comprises a rotatable cylindrical drum supported for rotation about a horizontal axis and having a filter medium on the cylindrical surface thereof. One end of the drum is open to entry of contaminated air into the inerior of the drum and the other end may be closed by an imperforate end wall. Suction collection means, such as a hopper or a suction conduit, is provided at a selected location within the drum having an inlet opening adjacent the inner surface of the cylindrical filter wall and communicating with an external collection facility for removing loose contaminants from the interior of the drum. A traveling cleaner blower assembly is supported outwardly of the cylindrical filter wall by a carriage mechanism driven along a track paralleling the filter axis so as to execute a cleaning stroke from the open air entering end of the drum to the closed end while the drum is being rotated about its axis and to cause the blower to stop and dwell for at least one drum rotation at the closed end of the drum before returning along the track to the open end. The cleaning air is discharged from the blower only during the cleaning stroke of the blower and is throttled off during the return stroke of the blower, so as to cause the lint and contaminant material blown from the surface of the filter drum to progress downstream toward the suction collection region and to insure that any dislodged material which is redeposited on the cylindrical filter surface during progression of the cleaning blower through the cleaning stroke deposits on uncleaned portions of the drum surface rather than on portions that have already been cleaned during that cleaning stroke.

Furthermore, as an additional improvement, the discharge nozzle of the cleaning blower may be rotated in an orbital or rotary path continuously as the blower progresses through the cleaning stroke to achieve more effective explosion or discharge of the mat of accumulated contaminant materials from the filter surface and disintegration of the same into small pieces which can be readily removed by the suction system, and permit higher cleaning air stream velocities to be used.

BRIEF DESCRIPTION OF THE FIGURES

FIGURE 1 is a perspective view of an installation of a rotary drum filter having the improved traveling cleaning blower assembly of the present invention;

FIGURE 2 is a fragmentary side elevation view of the traveling blower and supporting structure therefor, with parts broken away;

FIGURE 3 is a vertical section view taken along the line 3—3 of FIGURE 2;

FIGURES 4 and 5 are fragmentary bottom plan views, respectively, of the blower track structure adjacent the open end and closed end of the filter drum, viewed from the lines 4—4 and 5—5 of FIGURE 2;

FIGURE 6 is a fragmentary top plan view of the air inlet portion at the blower housing, and FIGURE 7 is an elevation view of a modified form of blower housing having a rotary nozzle, viewed from the position of line 3—3 of FIGURE 2, with parts broken away.

DETAILED DESCRIPTION OF A PREFERRED EMBODIMENT

Referring to the drawings, wherein like reference characters designate corresponding parts throughout the several figures, the basic rotary drum filter with which the traveling air blower assembly of the present invention is employed comprises a cylindrical filter drum 10, of the general construction illustrated in my earlier copending application Ser. No. 608,879, filed Jan. 12, 1967, which is supported for rotation about a substantially horizontal axis in suitable framework. For example, the filter drum 10 may have a circular channel-shaped ring 11 at the inlet or air entering end 12 of the drum peripherally supported for rotation about the center axis of the drum by rollers 13 bearing against surface of the ring 11, carried by suitable brackets extending from a stationary, circular angle iron frame 14 or by other suitable portions of a vertical partition or wall 15 to which the circular frame 14 is secured. The wall 15 has an opening therein conforming substantially to the opening defined by the circular frame 14 and preferably forms one wall of a room or enclosure in which the filter unit is located and to which suction is applied by suitable fans, as indicated diagrammatically in FIGURE 1, to effect suction of air from the interior of the filter drum 10 outwardly to the surrounding space. The ring 11 may be mounted in the circular frame 14 in the manner illustrated in greater detail in my said earlier application Ser. No. 608,879, or by other conventional roller supporting structure, and is peripherally driven, for example, by a drive chain and electric motor system, as illustrated in my said earlier application, or by other drive means such as electric motor 16 and driving roller 17 on the shaft thereof peripherally engaging and driving the ring 11, as illustrated in FIGURE 1.

The opposite or downstream end of the drum 11 in the illustrated preferred embodiment is closed by a solid and rigid disc-shaped filter drum head 18 of an outside diameter corresponding substantially to that of the ring 11 and connected adjacent its perimeter to the ring 11 by a series of flexible steel cables, as illustrated in my said earlier application, or by a wire screen having large openings therein, so as to correlate rotation of the ring 11 and drum head 18. The drum head 18 in this embodiment is centrally journaled for rotation, for example by a tubular conduit member 19 having a horizontal portion extending through a bearing in the filter drum head 18 and supported from the floor of the room or enclosure by appropriate framework, for example as disclosed in my said earlier application.

The filter medium 20 may be in the form of a large cylindrical sheet, the lateral edges of which are releasably attached to the ring 11 and to the drum head 18 adjacent the perimeter of the latter to support the sheet of filter material immediately inwardly of the system of cables or screen interconnecting the ring 11 and head 18. The open inlet end 12 or air entering end of the drum may simply open into a horizontal channel or conduit of any desired configuration or size through which the lint laden air is to be delivered to the filter, or the open inlet end of the drum may receive the exit end of an air handling duct of comparable cross sectional size and configuration so that the filter drum, in effect, forms a continuation or closed end extension of the air handling duct to receive and collect contaminants such as cotton or fiber masses in conglomerate masses or accumulations in the inside of the drum.

In the illustrated embodiment, a suction hopper 21, in the form of an upwardly opening trough which is of substantially V-shaped configuration in cross section and side elevation is disposed in the downstream half of the drum with its open upper end located inwardly adjacent the uppermost portion of the drum along an elongated zone paralleling the drum axis and its downwardly pointing apex portion located substantially on the center line of the drum. The suction conduit 19 hereinbefore described after passing inwardly through the filter drum head 18 opens directly into the lower portion of the hopper 21 to effect suction withdrawal of contaminants collected in the hopper through the cindut 19 and to the external collecting facility.

A traveling blower assembly 23 is provided for automatically periodically cleaning the filter surface of the drum 10 by reciprocating a blower 24 located externally of the cylindrical periphery of the drum along a rectilinear path from the upstream or inlet end 12 to the downstream end adjacent the head 18 in coordinated relation with rotation of the drum to direct a high velocity air stream radially inwardly through the cylindrical drum to dislodge the lint, dust and dirt from the inner surface of the filter media and progress it to the inlet opening of the hopper 21 for suction withdrawal to the external collection facility. The blower 24 includes a blower housing 25, a blower motor 26 and a motor base 27, which are supported for rectilinear travel on the elongated horizontal track 28, mounted, for example, at one end on the wall 15 and at its opposite end on supporting framework 29. The motor base 27 is equipped with wheels 30 rotatable about horizontal axes and bearing against the top flange of the track 28 and is stabilized by side guide wheels 31 rotatable about vertical axes and bearing against the lateral edges of the top flange of track 28. The blower housing 25 has a discharge outlet 32 terminating immediately above the uppermost portion of the cylindrical wall of the drum substantially in vertical alignment with the center axis of the drum in a blower nozzle 33, and has a circular air intake 34 controlled by a circular damper 35.

The damper 35 is carried on a vertical shaft 36 journaled in vertically aligned bearing apertures in the air intake 34 and extending downwardly to a position slightly below the track 28 through a bearing grommet 37 carried by a bracket 38 which is secured to the framework of the motor base 27 which supports the side guide wheels 31. The upper end portion of the shaft 36 projects slightly above the air intake 34 and is fastened to a crank arm 39 having an anchor post 39a on the end thereof disposed eccentrically relative to the shaft axis to which one end of an overcenter spring 40 is connected. The opposite end of the overcenter spring 40 is secured to a stationary anchor member 41 fastened to the top of the air intake 34 and having extensions 41a extending outwardly toward the anchor post 39a to arrest the crank arm 39 after 45 degrees of movement in either direction from the center line position. The damper 35 is fixed on the shaft 36 in angular relation to the crank arm to be spring-loaded into either the open or the closed position. The lower end of the shaft 36 terminates in a bushing 42 through which an operating rod 43 extends and is secured for regulating the position of the damper 35 in a manner to be later described.

The means for driving the blower 24 along the track 28 comprises an electric gear motor 45 rigidly secured to the track at the end adjacent the drum inlet end 12 and having a chain sprocket 46 fixed to its output shaft about which is trained a continuous roller chain 47. The chain 47 includes a special connecting link 49 having an extension pin 50 extending outwardly from the track and spaced from the plane of the adjoining links in a direction away from the center line of the two sprockets 46, 48. A connecting rod 51 is coupled at one end to the extension pin 50 and has a slide bolt 52 rigidly fixed to its opposite end. In practice, the connecting rod 51 is made up of two narrow elongated side plates or strips spaced apart by spacers 51a and secured together by rivets 51b extending through the spacers and side plates. The two side plates of the connecting rod 51 straddle a guide member 53 which is spaced away from but secured to a side plate 54 forming a rigid part of the motor base 27. The connecting rod 51 is restrained by a pin 55 on the side plate 54 so that the connecting rod cannot be depressed further than the position shown in FIGURE 2.

The traveling blower assembly may be activated in any suitable manner, such as by a conventional timer mechanism or by means sensing the differential pressure across the filter medium, to cause the blower to travel through a cleaning cycle of a selected number of advance or cleaning strokes to the downstream end of the drum and return through return strokes to the inlet end. Assuming the blower to be located at the upstream end of the track at the beginning of the cleaning cycle, when the blower motor 26 and gear motor 45 are energized to commence the cleaning cycle, the sprocket 46 of the gear motor rotates in a counterclockwise direction, as viewed in FIGURE 2, so that the bottom flight of the chain 47 moves from left to right carrying with it the connecting link 49 and connecting rod 51. The slide bolt 52 on the free end of the connecting rod 51 thus pushes against the bounding surface of the lower end of the inclined slot 53a in the guide member through which the slide bolt 52 projects, causing a like movement of the blower 24. When the blower 24 has been pushed all the way to the end of its travel through the cleaning stroke to the broken line position of FIGURE 2, the extension pin 50 of the connecting link 49 begins to negotiate the circumference of the idler sprocket 48, carrying the adjacent end of the connecting rod 51 around the idler sprocket 48. As the connecting rod 51 is pulled back toward the left-hand end of the track, as viewed in FIGURE 2, along the top flight of the chain 47, the slide bolt 52 moves freely up the guide slot 53a without moving the blower until the slide bolt 52 reaches the opposite end of the slot 53a and again abuts the bounding wall of the slot to transmit movement from the chain to the blower and effect return movement of the blower to the lefthand end of the track. The guide slot 53a not only adds to the delay caused by the extension pin 50 revolving around the center line of the idler sprocket 48, but also properly aligns the connecting rod 51 with the flight of the chain which is being used for the push or pull operation.

The traveling blower assembly also includes provision for opening the damper 35 before the dwell period at the left or upstream end of travel of the blower and for closing the damper after the dwell period at the right-hand end of travel. To achieve this, a spring operator assembly 56 is bolted to the bottom of the track 28 at an appropriate position near the location of the idler sprocket 48. The assembly 56 comprises a spring operator 57 of angular configuration carried by a bracket 58 having a rolled over clip portion 58a extending about and securing the short leg of the spring operator 57 to the bracket, a tab 58b extending downwardly between the two legs of the spring operator immediately adjacent the bight therein, and a recurved lip 58c extending outwardly about the longer leg of the spring operator and then along a plane paralleling the bottom flange of the track to limit flexing of the longer leg of the spring operator downwardly from the position illustrated in FIGURE 5 and to accommodate flexing thereof upwardly from the position illustrated. The spring operator assembly 56 is so located that, just before the blower 24 reaches the extreme right-hand position and the dwell starts, the operating rod 43 on the bottom of the shaft 36 moves past the spring operator assembly 56, flexing the spring operator 57 inwardly toward the track while the operating rod 43 is held against rotation because of the engagement of anchor post 39a against one of the extensions 41a of the anchor member 41. Thus the damper 35 is not moved from its open position by this camming operation. As soon as the operating rod 43 passes the spring operator 57, the spring is allowed to fall back into position behind the rod 43. As soon as the dwell period is over and the blower carriage again begins to move from right to left through its return cycle, the operating rod 43 catches behind the outwardly projecting longer arm of the spring operator 57, which is restrained from movement in response to such contact by the lip 58c of the bracket 58. This contact of the operating rod 43 against the spring operator 57 during the return stroke of the carriage then causes the shaft 36 to rotate through 90 degrees, after which the portion of the control rod engaging the spring assumes the proper position to press the spring operator 57 inwardly and allow the operating rod 43 to pass. This 90 degree rotation of the shaft 36 produced by the spring operator 57 rotates the damper 35 to the closed position, causing the air to be cut off during the return stroke of the blower to the upstream or inlet end position.

As the blower 24 approaches the left-hand or upstream end position, the end portion of the operating rod 43 most remote from the track is intercepted by a vertical pin 59 on a mounting plate 60 carried by and spaced below the bottom flange of the track 28 and below the path of the lower end of shaft 36. The vertical pin 59 is so located relative to the drive sprocket 46 that it engages the operating rod 43 during the return stroke of the blower when the blower reaches its extreme left-hand or inleg end position at the start of the dwell period which occurs as the connecting link 49 negotiates the circumference of the drive sprocket 46. In this manner, the damper 35 is forced from the air-off position to the air-on position by contact of the operating rod 43 with the pin 59 as the dwell period starts, so that air is blowing throughout the dwell period at the upstream or inlet end of the drum.

While effective cleaning of the filter drum can be achieved by the above-described construction using conventional types of fixed nozzles, improved cleaning and operating characteristics can be realized by employing a rotating blower nozzle which causes rotating orbiting of the cleaning air stream as the blower progresses through its cleaning stroke. An example of a suitable rotary blower nozzle structure is shown in FIGURE 7 and indicated generally by the reference character 33'. In the illustrated embodiment, an elbow conduit section 61 is provided at the outer end of the discharge outlet or transfer tube 32 of the blower to direct the air back down towards the center line of the filter drum, and contains a spider type support structure 62 in the outlet end thereof for rigidly supporting a stud 63 in vertical position at the center line of the elbow discharge while still allowing free passage of air out of the elbow. A bearing housing 64 is rotatably mounted on the stud 63 below the spider assembly 62 by bearings 64a and is rigidly attached to the upper walls of the nozzle 33' by a spider assembly 65. The nozzle 33' may be constructed in any number of conventional ways to cause rotation about the stud 63. One simple expedient would be to simply provide an offset nozzle, as illustrated in FIGURE 7, which would deflect air away from the center line of the stud 63, so that rotation of the nozzle would cause the principal axis of the discharge air stream to orbit in a circular path about the center line of the stud 63, and provide an indentation 66 on one side of the nozzle 33 near its discharge point and on the leading edge of the nozzle as it rotates to deflect some of the air perpendicular to its principal discharge direction. Alternately, propeller type vanes may be incorporated in the spider assembly 65 to achieve rotation of the nozzle 33', or the nozzle may be independently driven by a small electric or fluid motor mounted on the elbow section 61 and having a pinion on its output shaft meshing with a gear ring on the exterior surface of the nozzle 33' adjacent its juncture with the elbow.

By such a rotating nozzle arrangement on the traveling blower, the filter mat of accumulated contaminants can be more effectively exploded from the interior surface of the drum and dislodged in small pieces which can be effectively withdrawn through the collection hopper to the external suction facility. It will be apparent that during movement of the blower through the cleaning stroke from the upstream end position, the cleaning air stream is approaching the fairly heavy lint mass in a direction having a component extending longitudinally of the filter drum dependent upon the blower carriage speed and a component extending normal to the axis of the drum dependent upon the rotational speed of the filter medium. Hence, in cleaning systems used heretofore, it has been customary to regulate these speeds so that only a relatively narrow spiral path is cleaned by the cleaning nozzle, for example, a spiral path of about two to three inches wide, with a twelve inch nozzle, and the overall tendency in some cases has been for the cleaning air stream to merely roll the filter mat on itself instead of exploding the mat away from the filter surface and into small pieces which can be easily taken away by the suction air stream. If this roll develops itself to a large enough extent before coming loose from the filter surface, it may plug the suction opening in the collection hopper or fall onto the lower surface of the filter where it will resist ready removal by the suction system. By use of the rotating nozzle structure herein described, wherein the air stream progresses in an orbital path so that it can attack the lint back a significant distance from the boundary between the mat and the zone which has just been cleaned, for example, attack the lint back about eight inches from the edge bounding the cleaned area, and sweep the air stream outwardly toward the area previously cleaned, the filter mat is kept from rolling upon itself and the air is allowed to more easily get under the mat to explode it away from the filter surface. Also, the air discharged through such a rotating nozzle can have extremely high velocity without unduly sagging the filter material intercepted by the air stream toward the rigid hopper because the air pressure is not sustained on any one portion of the filter mat for any extensive length of time. In practice, it has been found that provision of a nozzle which rotates approximately two hundred revolutions per minute imparts a desirable agitation to the filter media and the accumulated lint and contaminant materials thereon so that the lint mass can be more effectively removed.

What is claimed is:

1. In combination with air filtering apparatus including a filter drum in the form of an axial elongated cylinder rotatable about the axis of the cylinder having first and second opposite ends and a cylindrical filter medium concentric with said axis extending between said ends, said first end being an open air inlet end communicating with a source of contaminant laden air to receive the air into the interior of the drum, the air being withdrawn outwardly through said filter medium to strip the contaminants therefrom and accumulate the contaminants on the interim surface of the filter medium; apparatus for cleaning said filter medium comprising suction withdrawal means for establishing a suction collection zone within said drum for suction withdrawal of contaminants reaching said zone to an external location, means for rotating said drum, traveling blower means including a cleaning nozzle positioned closely adjacent the exterior surface of said filter medium for blowing a cleaning pressurized air stream inwardly through said filter medium to dislodge the contaminant accumulations from said interior surface, means for reciprocatively scanning said blower means along a rectilinear scanning path paralleling said axis through a cleaning stroke progressing said nozzle from first to second stations respectively adjacent said first and second ends and through a return stroke to said first station during concurrent rotation of the drum to progress the pressurized air stream along a spiral cleaning path over said exterior surface, means for stopping scanning of said blower means at each of said first and second stations for a dwell period of sufficient duration for at least one complete revolution of the drum, and control means conditioning said blower means to produce said pressurized air stream throughout said cleaning stroke and dwell periods and disabling production of said air stream throughout said return stroke.

2. Apparatus as defined in claim 1, wherein said means for scanning said blower means includes an endless chain trained about sprockets adjacent said first and second stations, a motor for rotating one of said sprockets in a single direction for driving said chain, and a connecting rod having coupling means at opposite ends thereof connected respectively to said blower means and to a portion of said chain, one of said coupling means including a lost motion connection for accommodating relative movement of the chain with respect to the blower means without imparting movement to the latter during a selected period after reversal of the direction of movement of said portion of said chain to stop scanning of the blower means for said dwell period and for transferring movement from said chain to said blower means between said periods.

3. Apparatus as defined in claim 2, wherein said lost motion connection comprises a plate fixed to the blower means having an elongated slot therein of selected length and slot end surfaces spaced longitudinally of said scanning path, and said connecting rod having a slide pin member tracking in said slot to abut either of said slot end surfaces and transfer chain motion to said blower means.

4. Apparatus as defined in claim 2, including an elongated track disposed outwardly adjacent said filter medium in parallelism with said axis for guiding said blower means along said scanning path, said blower means including a carriage wheel supported on said track, said sprockets being supported on said track along one side thereof for rotation about horizontal axes and disposing said chain in a path providing upper and lower horizontal flights, said lost motion connection comprising a vertical plate member fixed to said carriage and depending alongside said track adjacent said chain having an elongated inclined slot therein of selected length extending between upper and lower slot end surfaces respectively adjacent the levels of said flight and spaced longitudinally of said scanning path, and said connecting rod being pivotally connected at one end thereof to a selected link of said chain and having a slide pin member at the other end thereof tracking in said slot to abut either of said slot end surfaces and transfer motion of said chain to said blower means when abutting said slot end surfaces in selected relation to the direction of connecting rod movement.

5. Apparatus as defined in claim 1, wherein said blower means includes an air regulating member having first and second positions respectively allowing and preventing discharge of the pressurized air stream from said nozzle, said control means including first and second actuating members disposed respectively at stationary locations adjacent said first and second stations for shifting said air regulating member between said first and second positions, said air regulating member including an operating member extending to a location to be engaged by said actuating members during travel of the blower means along said scanning path and coacting with said actuating members to dispose said air regulating member in said first position throughout said cleaning stroke and said dwell periods at each of said stations and to dispose the air regulating member at said second position throughout said return stroke.

6. Apparatus as defined in claim 1, including an elongated track for guiding and supporting said blower means along said scanning path, said blower means including a blower housing having an air inlet opening and a pivoted damper movable between open and closed positions relative to said air inlet opening for respectively enabling and disabling production of said pressurized air stream, said damper including a pivot shaft projecting to a position alongside said track and having an operating extension thereon for rotating said shaft to move said damper between said positions, and said control means including first and second actuating members fixed on said track adjacent said first and second stations for intercepting said operating extension during travel of said blower means along said scanning path, said second actuating member including means for admitting passage of said operating extension thereby during said cleaning stroke without moving said damper from said first position and for activating said operating extension at the beginning of said return stroke of said blower means to move said damper to said second position, and said first actuating member including means engaging and activating said operating extension at the end of said return stroke for moving said damper to said first position to dispose said damper in open position throughout said dwell period at said first station.

7. Apparatus as defined in claim 6, wherein said operating extension comprises a radial arm on said shaft, and said second actuating member comprises a spring arm extending into the path of said radial arm and supported so as to be flexibly deformed by said radial arm without changing the angular position of the radial arm during movement of the blower means through said cleaning stroke and to be restrained to rotate the radial arm about the axis of said shaft during return stroke movement of the blower means and dispose said damper in closed position.

8. Apparatus as defined in claim 1, wherein said nozzle is rotatably supported on said air outlet duct for rotation about a rotation axis extending substantially normal to said cylinder axis and is shaped to discharge said cleaning air stream along a discharge axis inclined to said rotation axis, said nozzle including means for continuously rotating said nozzle about said rotary axis during discharge of said air stream therefrom.

9. Apparatus as defined in claim 1, wherein said last-mentioned means comprises surface means within said nozzle in the flow path of pressurized air flowing therethrough shaped to impart rotation to said nozzle responsive to said pressurized air.

References Cited

UNITED STATES PATENTS

| | | | |
|---|---|---|---|
| 2,495,635 | 1/1950 | Hersey | 55—294 |
| 2,981,644 | 4/1961 | Fain | 15—312 |
| 3,000,507 | 9/1961 | Young | 210—402 |
| 3,166,391 | 1/1965 | Keser | 55—302 |
| 3,339,348 | 9/1967 | Bratton et al. | 55—301 |
| 3,345,805 | 10/1967 | Sherrill | 55—290 |
| 3,360,907 | 1/1968 | Clark et al. | 55—290 |

HARRY B. THORNTON, Primary Examiner

BERNARD NOZICK, Assistant Examiner

U.S. Cl X.R.

55—294, 302